Dec. 16, 1969 M. N. HALUS 3,484,663

JUNCTION TYPE SEMICONDUCTOR OPTICAL DISCRIMINATOR

Filed Sept. 25, 1968

INVENTOR.
MICHAEL N. HALUS

BY [signature]
ATTORNEY

United States Patent Office 3,484,663
Patented Dec. 16, 1969

3,484,663
JUNCTION TYPE SEMICONDUCTOR OPTICAL DISCRIMINATOR

Michael N. Halus, Palo Alto, Calif., assignor to Sylvania Electric Products Inc., a corporation of Delaware
Filed Sept. 25, 1968, Ser. No. 762,546
Int. Cl. H01l 11/00, 15/00
U.S. Cl. 317—235 2 Claims

ABSTRACT OF THE DISCLOSURE

An optical discriminator comprising a pair of junction diodes on a single semiconductor substrate. The substrate is an n-type semiconductor material having a thickness defined by parallel faces to which a p-type semiconductor layer is diffusion bonded. Light is introduced into the discriminator normal to the p-n junctions, the first junction naving a broadband spectral response and the second junction having a narrow band response within the bandwidth of the first junction. Contacts are formed on opposite sides of each junction and produce two outputs which are compared or combined to provide discrimination between light at two wavelengths within the broad spectral response of the first junction.

BACKGROUND OF THE INVENTION

This invention relates to optical devices, and more particularly to a solid state optical discriminator.

There is often need in optical systems for discriminating between light at different wavelengths. Such applications might include an optical receiver, a detector or an optical filter. Heretofore it has been necessary to construct separate photoelectric devices such as photodiodes which are responsive to the respective wave lengths of interest in order to derive outputs useful for discrimination purposes in optical systems. Such multipiece discriminators are inconvenient to handle and to incorporate in compact systems.

A general object of this invention is the provision of a one-piece dual junction optical discriminator that may be readily made at low cost.

SUMMARY OF THE INVENTION

A silicon semiconductor photodiode is configured to distinguish between two incident optical signals at different wavelengths with two p-n junctions on a single substrate. Such a configuration enables discrimination between signals at the two wavelengths instantaneously with a single sensor. The first junction traversed by the incident light has a broadband response whereas the filtering action of the substrate next traversed by the signal results in a narrow band response of the second junction within the bandwidth of the first junction. By utilizing the outputs of these two junctions, instantaneous spectral discrimination is achieved.

DESCRIPTION OF PREFERRED EMBODIMENT

Figure 1:
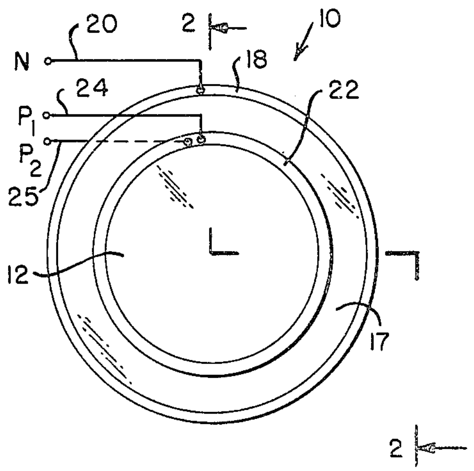
FIGURE 1 is an elevation of a photodiode discriminator embodying this invention.
Figure 2:
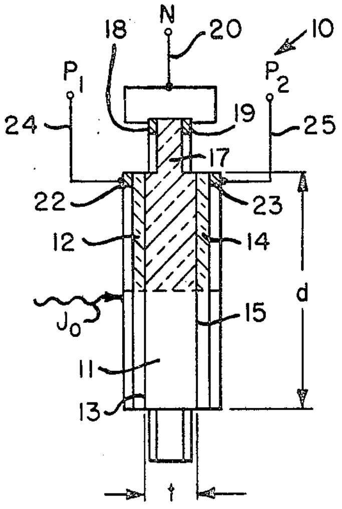
FIGURE 2 is a view partly in section of the discriminator taken on line 2—2 of FIGURE 1.
Figure 3:
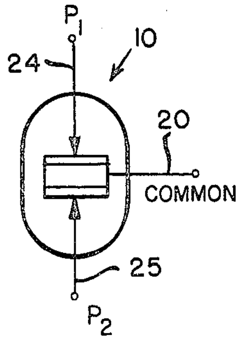
FIGURE 3 is a schematic view of an equivalent circuit for this discriminator.

An optical discriminator embodying this invention is illustrated as a dual photodiode 10 in FIGURES 1 and 2 and comprises a silicon substrate 11 having an n-type conductivity, a first layer 12 of a material having p-type conductivity diffused on one surface of the substrate to form p-n junction 13, and a second layer 14 of p-type conductivity material diffused to the opposite side surface of substrate 11 to form the second p-n junction 15. Substrate 11 may be disc-shaped as shown and has peripheral portion 17 formed with a reduced thickness as by etching or the like. Annular contacts 18 and 19 are formed on opposite sides of the peripheral portion 17 of the substrate and may be connected together to a common terminal 20 which forms the negative output from the device. Similarly, annular electrical contacts 22 and 23 are bonded to the peripheries of p-type layers 12 and 14, ·espectively. Terminals 24 and 25, connected to contacts 22 and 23, respectively, constitute the positive output terminals for the device.

Figure 4:
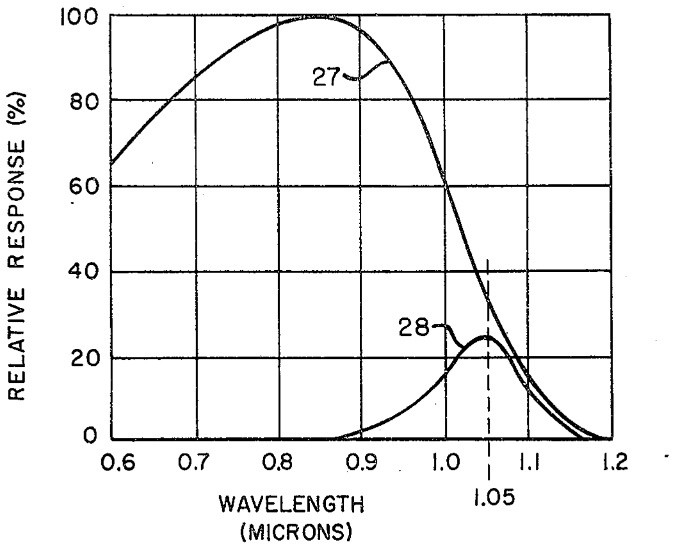
FIGURE 4 shows curves illustrating the spectral response of the discriminator.

Incident light $J_0$ directed normal to the p-type layer 12 as shown in FIGURE 2 traverses junctions 13 and 15 which have a resultant spectral response as shown by curves 27 and 28, respectively, see FIGURE 4. Thus, the output at terminals 20 and 24 indicated by curve 27 is relatively high across a substantial part of the spectral band of interest whereas the output across terminals 20 and 25 (curve 28) is negligible for the shorter wavelengths and peaks at a relatively narrow portion of the band at the longer wavelengths. In other words, the peak response of the two p-n junctions to the same light at the same time is frequency or wavelength separated, thus uniquely providing a means of simultaneously discriminating between spectral energy at different wavelengths.

Curves 27 and 28 were plotted as a result of direction the light output of a spectrophotometer as the light $J_0$ on a dual junction discriminator having a diameter $d$ of 1 inch, a silicon substrate 11 having a thickness $t$ of 0.02 inch, and p-type diffusant layers 12 and 14 of boron. It will be noted that the peak response of curve 27 occurs at 0.85 micron whereas curve 28 peaks at approximately 1.05 microns. It is believed that the silicon substrate 11 functions as an optical filter for the shorter wavelengths of the input light $J_0$ and permits only the longer wavelength components to reach the second junction 15. It will be noted that the distribution of available energy between the two junctions is nearly equal at 1.05 microns, which is the output wavelength of a standard neodymnium: yttrium aluminum garnet laser system and therefore this device is useful in the detection of such laser systems.

Figure 5:
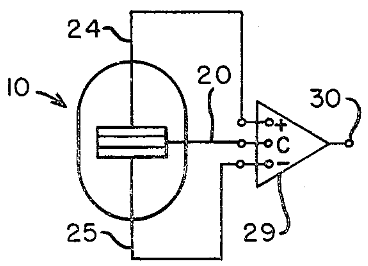
FIGURES 5 and 6 show circuit arrangements for subtraction and addition of the outputs of the two junctions of the optical discriminator.
Figure 6:
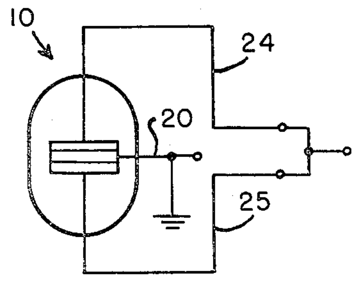

The advantage and utility of this device is the spectral discrimination that can be performed with a single detector in an optical system such as a radiometer. By appropriate interconnection of the terminals 20, 24 and 25, the outputs of the two junctions may be subtracted or added to quantify and identify spectral energy in the input light. For example, if it is desired to pass only wavelengths up to 0.9 micron, see FIGURE 4, the output of the second p-n junction 15 is subtracted from that of the first p-n junction 13 as shown in FIGURE 5. Terminals 24 and 20 are connected to the positive and common input terminals, respectively, of an operational amplifier 29. Terminal 25 is connected to the negative input terminal of the amplifier. Thus, electronic subtraction as a function of respective wavelength sensitivity is performed within the amplifier and the difference appears at the amplifier output on line 30. On the other hand, if light at wavelengths less than 1 micron is initially optically filtered from the incident light $J_0$, the spectral sensitivity at 1.05 microns may be enhanced by addition of the outputs from the two junctions, where terminals 24 and 25 are connected together as indicated in FIGURE 6. One use of such a circuit is as a detector of the output of a neodymnium laser system.

The optimum thickness of a device embodying this invention is $1/\alpha$ where $\alpha$ is the absorption coefficient of the substrate. Since the absorption coefficient of a material such as silicon varies considerably as a function of temperature, the environment in which the device is used will often dictate the absolute thickness of the device.

What is claimed is:

1. An optical discriminator comprising a substrate of semiconductor material of one conductivity type having plane side surfaces, a diffusant layer of material having a conductivity opposite to said one type diffused into each of the side surfaces of said substrate and defining therewith separate p-n junctions, and separate electrical contacts connected respectively to said substrate and to each of said layers whereby to derive an electrical output across each junction in response to incident light directed normal to said junctions.

2. The discriminator according to claim 1 in which said light passes therethrough in one direction, and means for combining the electrical output across one junction with the output across the other junction whereby to quantify and identify the spectral energy of said light.

References Cited

UNITED STATES PATENTS

| | | | |
|---|---|---|---|
| 3,061,726 | 5/1969 | Garbuny et al. | 250—83.3 |
| 2,994,054 | 7/1961 | Peterson | 338—19 |
| 3,048,797 | 8/1962 | Linder | 332—31 |
| 3,053,926 | 9/1962 | Ben-Sira et al. | 136—89 |
| 3,147,414 | 9/1964 | Pelfrey et al. | 317—240 |
| 3,222,530 | 12/1965 | Kalhammer | 250—211 |

JOHN W. HUCKERT, Primary Examiner

M. H. EDLOW, Assistant Examiner

U.S. Cl. X.R.

250—83, 83.3, 211; 330—39